Aug. 16, 1966   H. G. DEHMELT   3,267,360

OPTICAL ABSORPTION MONITORING OF ALIGNED ALKALI ATOMS

Original Filed March 28, 1957

INVENTOR.
Hans G. Dehmelt
BY
Attorney

United States Patent Office 3,267,360
Patented August 16, 1966

3,267,360
OPTICAL ABSORPTION MONITORING OF ALIGNED ALKALI ATOMS
Hans G. Dehmelt, Seattle, Wash., assignor to Varian Associates, Palo Alto, Calif., a corporation of California
Continuation of application Ser. No. 649,190, Mar. 28, 1957. This application Oct. 2, 1963, Ser. No. 313,186
12 Claims. (Cl. 324—.5)

The present invention relates in general to optical monitoring of one optical electron quantum systems and more particularly to the optical detection of alignment of alkali atoms of relatively long relaxation times.

This application is a continuation of copending patent application, Serial Number 649,190, filed March 28, 1957, and assigned to the same assignee, and now abandoned.

This present invention deals with the art of quantum mechanics in atomic physics and, since statements of certain facts of atomic physics necessary to an understanding of this invention will be given without setting forth proof, the reader not thoroughly versed in quantum mechanics is referred to the various complete texts on atomic physics and quantum mechanics for detailed discussion and proof of such facts. This invention is an improvement on the invention disclosed and claimed in the United States Patent 3,071,721, assigned to the same assignee.

As the construction of the atom is now understood, a central nucleus has one or more electrons circling it in elliptical orbits which are referred to as energy levels or states. An atom can exist only with its electrons in these definite discrete energy states but an electron may move to a higher energy state by the absorption of a definite quantum of energy from an external energy source or it may fall to a lower energy level by giving up or radiating a definite quantum of energy. These different quanta of energy E are mathematically defined as $h\nu$, where $h$ is Planck's constant and $\nu$ is the particular frequency of the radiation or absorption spectral line for each quantum. In the case of one optical electron quantum systems, the optical energy level structure is attributable to a single unpaired electron in an outermost S or P shell.

The nuclei and electrons of atoms also possess certain properties of interest here, that is, nuclear spin angular momentum, electron orbital angular momentum, and electron spin angular momentum, and, as a result of such angular momenta, possess magnetic moments. The magnetic moment of the atom is the vector sum of the magnetic moments of the nucleus and electrons of the atom. Due to the interaction between the nuclear and electronic momenta, an energy level of an atom may be split up into two or more hyperfine energy levels, such levels commonly being designated by the quantum number F having different numerical values which designate different total angular momenta values. In addition, in accordance with the well known Zeeman effect, the magnetic moment of the atom, in an external magnetic field, may take up certain orientations relative to the direction of the external magnetic field, i.e., the magnetic field splits a particular energy level into a plurality of sublevels (Zeeman magnetic sublevels) which are each separated slightly in the spectrum by an energy quantum $h\nu_L$, where the value of the frequency $\nu_L$ in this instance is known as the Larmor frequency. The magnetic moments of the atoms in the different sublevels are oriented in different directions relative to the direction of the level-splitting magnetic field $H_0$, these orientations of magnetic moments being identified by reference to their $z$ vector component, that is, the projection of the magnetic moment vector in the direction of the magnetic field $H_0$.

To illustrate, in an energy state of total angular momentum $F=2$ split into five sublevels, there are five resultant $z$ component projections M of the atom magnetic moments. In the central energy state sublevel, the projection M is zero ($M=0$) which, of course, results from the fact that in this particular sublevel the magnetic moments are oriented in a plane normal to the direction of the magnetic field $H_0$. There are two components, $M=+1$ and the larger component $M=+2$, in the direction of the magnetic field $H_0$ and two components, $M=-1$ and $M=-2$, anti-parallel to the direction of the magnetic field $H_0$.

Under suitable conditions, certain of which will be hereinafter described, certain of the Zeeman sublevels may become predominantly populated relative to the other sublevels, that is overpopulated, and thus there are more magnetic moments of atoms oriented in one direction than in any of the other directions; in other words, not all M states are equally populated. Such over-population is hereinafter referred to as alignment of the system.

The present invention has for its purpose the alignment of one optical electron quantum systems such as the atoms in the alkali group of elements with long relaxation times in an external magnetic field by optical pumping techniques and the subsequent optical detection of the light utilized for the optical pumping whereby said alignment may be monitored. One embodiment of the invention utilized to illustrate and explain this invention employs sodium atoms and operates in the following manner. The sodium atoms in vapor form are placed in a buffer gas of argon of much higher pressure than deemed usable before which insures that the sodium atoms, once aligned, do not lose their alignment rapidly. As stated above, atoms may be raised to higher levels or drop to lower levels, and thus lose their alignment, i.e., shorten their relaxation time, by absorbing or radiating the necessary quanta of energy, for example, by collisions. To prevent such collisions the argon buffer gas is utilized, this gas serving as a type of cushion or medium with which the sodium atoms may collide *without* distrubing the spin state of the sodium atom. Thus, sodium atoms are prevented from colliding with the walls of their containing vessel resulting in a greatly lengthened relaxation time in the ground state.

In the present embodiment, the alignment of the sodium atoms in an external magnetic field $H_0$ applied to the atoms is accomplished by known optical-pumping techniques. Generally speaking, the optical-pumping process involves the application of an optical radiation, which is parallel to the magnetic field $H_0$ and also circularly polarized, to the atoms in their Zeeman sublevels, the radiation frequency being of the frequency necessary to raise the atoms to a higher energy state. Due to the fact that the radiation is circularly polarized, one of the selection rules $\Delta M=+1$ or $\Delta M=-1$ governs, dependent on the direction of rotation of the polarization, and as a result only atoms in certain ones of the sublevels absorb energy and are raised to the higher energy state. Atoms in the other one or ones of the sublevels do not absorb energy and remain in their sublevel. The atoms raised to the higher energy state may return by, for example, collisions and/or the emission of radiation to the lower energy state from which they were raised. In the presence of the high pressure buffer gas these atoms return indiscriminately to the sublevels of this lower state; therefore the sublevels from which atoms are not raised (nonabsorbing levels) gain atoms at the expense of the other sublevels (absorbing levels), resulting in a substantial overpopulation of the nonabsorbing sublevel or sublevels and thus a substantial alignment of the atoms, and this technique has been termed optical pumping. In the case of sodium atoms utilized to describe this invention, these atoms are aligned in one sublevel in a hyperfine state of their ground or lowest energy state $3^2S_{1/2}$. The actual optical pumping process and the resultant alignment of the sodium atoms is a complex quantum mechanical phenomenon which has been treated in the atomic physics art and no attempt will be made here to explain its detailed theory. The apparatus and its operation needed to obtain the optical pumping of the sodium atoms and a general discussion of the energy levels involved plus the results achieved will be set forth hereinafter.

Thet optical radiation utilized to optically pump the atoms is detected after it has passed through the sample of atoms. The absorption of optical radiation by the atoms in aligning is, of course, a measure of the alignment of the atoms since an over-population of the nonabsorbing sublevels results in a decrease in the optical radiation absorbed and thus, an increase in the light detected after it passes through the atom sample. Consequently, while the optical pumping is going on, the initially transmitted light intensity $I_1$ will increase to a value $I_1+\Delta I$ as the atom alignment builds up. If the axial magnetic field $H_0$ is suddenly reversed, the alignment of the atoms will follow adiabatically. This leads to a nearly instantaneous exchange of the population of the Zeeman $+M$ and $-M$ sublevels and now an overpopulation of the absorbing sublevels. The result is a sudden decrease of the transmitted light intensity from $I_1+\Delta I$ to $I_1-\Delta I$. Such effect makes the novel system suitable for use as a fast acting, sensitive light shutter. Similarly, a system previously polarized by $\Delta M=+1$ pumping, and consequently enriched in non-absorbing atoms as far as this polarization is concerned, will exhibit strong absorption for $\Delta M=-1$ radiation polarization.

It will be noted that this invention distinguishes from the detection of alignment of atoms by detecting the polarization of light scattered by the atom sample as proposed in the prior art.

It is, therefore, the object of the present invention to provide a novel method and apparatus for aligning one optical electron quantum systems such as alkali substances by optical pumping techniques and for monitoring the orientation or alignment of the quantum systems by optically detecting the light utilized for the optical pumping after it has passed through the substance.

One feature of the present invention is the provision of a novel method and apparatus for optically pumping the atoms of alkali substances in buffer gases of high pressure.

Another feature of the present invention is the provision of a novel method and apparatus for optically pumping the atoms of alkali substances in buffer gases and subsequent detection of the optical pumping light after it has passed through the substance for thereby monitoring the alignment of atoms in fields preserving alignment such as magnetic fields.

Another feature of the present invention is the provision of a novel system of the immediately preceding type wherein the alignment of the atoms may be suddenly reversed to suddenly change the intensity of the light transmitted through the substance.

These and other features and advantages of the present invention will become apparent from a persual of the following specification taken in connection with the accompanying drawings wherein, FIG. 1 is a block diagram of one embodiment of the present invention for optically pumping and monitoring sodium atoms, FIG. 2 is a schematic diagram depicting the energy levels of sodium atoms of particular interest and the transitions therebetween. Since not relevant for the present discussion no attention has been paid to the signs of the g-factors associated with the various F-levels.

Figure 1:
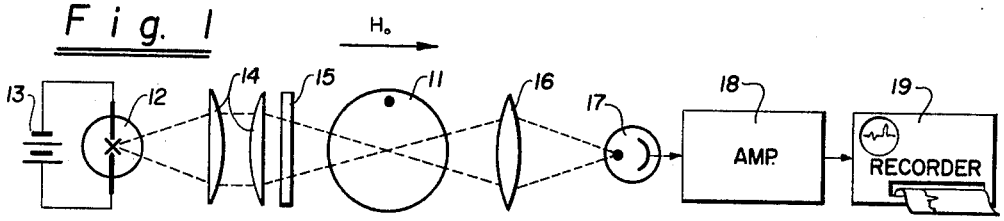

Referring now to FIG. 1 there is shown one embodiment of the present invention which utilizes an evacuated spherical glass absorption vessel 11 of about 1 liter containing a small amount of metallic sodium in equilibrium with its vapor and containing argon at a relatively high pressure of about 30 mm. Hg. The reasons for the relatively high pressures desired will be discussed below. The absoprtion vessel is heated to such a temperature (130–150° C.) that about 50% absorption occurs. The argon acts as a buffer gas for the sodium as explained above and it results in the realization of a relaxation time of about .21 seconds for the alignment of the sodium atoms.

Figure 2:
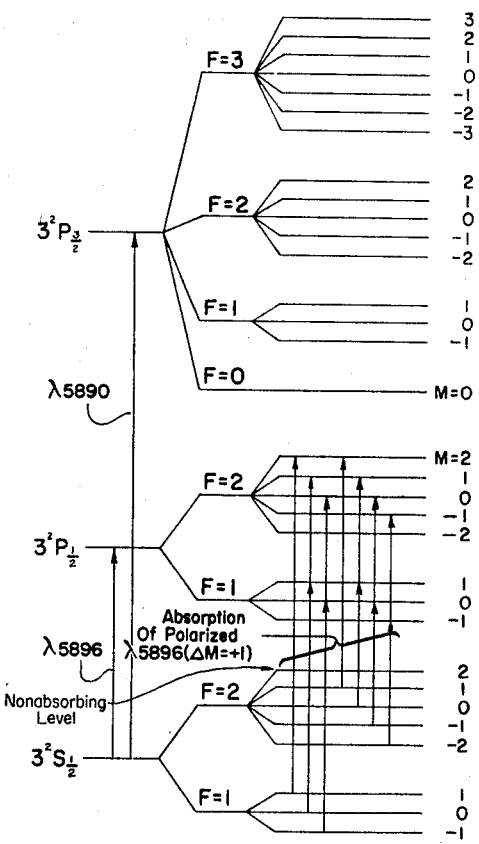

The ground or lowest energy state of the sodium atoms is the $3^2S_{1/2}$ level which is split into two hyperfine states $F=1$ and $F=2$ (see FIG. 2). The vessel is located in a magnetic field $H_0$ which may, for example, be the earth's magnetic field and the $F=1$ hyperfine state is split into three Zeeman sublevels $M=0, \pm 1$ while the $F=2$ hyperfine state is split into five Zeeman sublevels $M=0, \pm 1, \pm 2$.

A source of potical radiation of $\lambda 5896$ Angstrom units is provided comprising a commercial sodium arc lamp 12 operated from a battery 13, the lamp being mounted on a Dewar (not shown). The radiation from the lamp is focused by a condenser lens 14 through a circular light polarizing sheet 15 into the absorption vessel 11. In this particular embodiment the optical radiation is parallel to the magnetic field $H_0$ and the circular polarization is clockwise looking from the source 12 to the vessel 11. The optical radiation from lamp 12, after it has passed through the vessel 11, is focused by lens 16 upon a vacuum photocell 17 whose output is amplified by a broad band amplifier 18 and displayed on an oscilloscope or graphic recorder 19.

In accordance with known quantum theory selection rules, the circularly polarized optical radiation induces $\Delta M=+1$ transitions of the sodium atoms between the ground state $3^2S_{1/2}$ and the higher energy state $3^2P_{1/2}$ which are separated $\lambda 5896$ A. in the spectrum. The $3^2P_{1/2}$ state (see FIG. 2) is split into two hyperfine states $F=1, 2$ which are in turn split into three and five Zeeman sublevels, respectively. Due to the selection rule $\Delta M=+1$, all of the sodium atoms in the Zeeman sublevels in the $3^2S_{1/2}$ state except those in the $M=+2$ sublevels of the $F=2$ hyperfine level absorb energy from the $\lambda 5896$ radiation and are raised to the $S^2P_{1/2}$ level. The atoms in this higher level may return to the ground state sublevels by giving up the necessary quanta of energy as radiation or by collisions or the like and quantum theory rules permit the atoms to return to the different sublevels without discrimination. As a result, the non-absorbing $M=+2$ sublevel gains atoms at the expense of the other sublevels until a saturation polarization is attained.

The amount of radiation absorbed by the sodium atoms may be determined by means of the photoelectric cell 17, the D.C. output of the photocell 17 being a direct function of the $\lambda 5896$ radiation impinging thereon. Thus increased radiation absorption in the absorption vessel 11 will result in a decrease in the D.C. output from the photocell 17 which may be viewed as an increased or decreased signal, by selection of suitable electrical amplification means, on the recorder device 19.

Since the amount of radiation absorbed will be directly related to the proportion of the sodium atoms in the absorbing sublevels of the $3^2S_{1/2}$ state as opposed to those in the non-absorbing $M=+2$ sublevel, the measurement of such absorption affords a very useful means for determining if, in fact, the alignment of the atoms in the $3^2S_{1/2}$ energy state has actually occurred and to what extent.

Actually, the process of optical pumping for alignment of the sodium atoms is much more complex than the simple illustration given above. For example, there is also present in the sodium light source λ5890 radiation in addition to the λ5896 (these two radiations are the so-called D lines of sodium) and this λ5890 radiation is of the proper frequency to raise the sodium atoms from the ground state to the $3^2P_{3/2}$ energy state which is composed of four hyperfine states $F=0$, 1, 2 and 3 which in turn comprise 16 Zeeman sublevels. This affects the number of sodium atoms which populate the sublevels of the ground state in the following manner.

Figure 3:
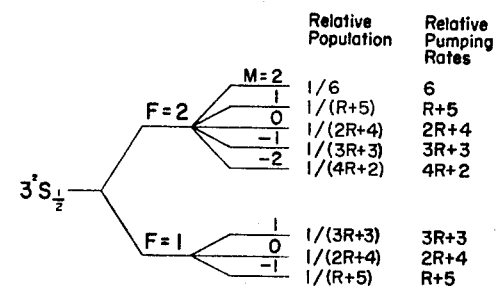
FIG. 3 is a schematic diagram of the ground states of sodium atoms showing the saturation ratio of distribution of the atoms in the sublevels, R being the intensity ratio $$\frac{I(D_1)}{I(D_2)},$$

Let the ratio of the intensity of the λ5896 light to the intensity of the λ5890 light be R, then the ratios of the transition probabilities for pumping out of the ground state Zeeman sublevels and their relative populations are as shown in FIG. 3, since the return rates from the $^2P$ level to the magnetic sublevels of the ground state are assumed to the same for all M values. From these ratios it is seen that if the intensities of the λ5896 and λ5890 light are equal ($R=1$) all of the Zeeman sublevels of the ground state are equally populated and thus no alignment of the system occurs. However, as R becomes larger it can be seen that the $M=+2$ sublevel of the hyperfine $F=2$ state becomes nonabsorbing and overpopulated relative to the remaining Zeeman sublevels and thus the magnitude of the alignment is a function of the ratio of the intensities of the different radiations from the sodium lamp. Commercial sodium lamps are readily available in which a substantial differential exists between the intensity of the two D lines. Also, one or the other of these D lines may be filtered out by filter 15' in FIG. 1, if desired and in this way by use of pure $D_1$ radiation 100% concentratoin of the atoms in the $F=2$, $M=2$ sublevel may be obtained, largely independent of the detailed return Other alignment processes will immediately occur to those skilled in this art such as, for example, by a circular polarization of the transmitted sodium light opposite, that is, counterclockwise, to that in the above illustration, the quantum theory selection rule $\Delta M = -1$ governs and the $M=-2$ magnetic sublevel of the hyperfine $F=2$ level of the ground state is the nonabsorbing level and becomes overpopulated relative to the remaining magnetic sublevels.

Figure 4:
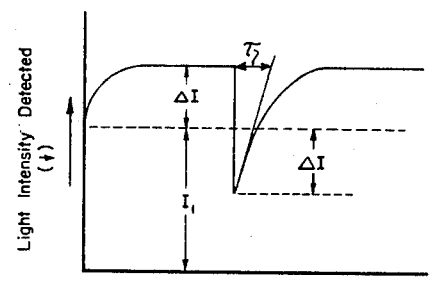
FIG. 4 shows a plot of the intensity of the light transmitted through the sodium atoms versus time and serves to show the effect of sudden reversal of the magnetic field $H_0$.

Any effect which tends to change the relative populations of the magnetic sublevels and produce a change in the number of atoms in the absorbing sublevels will produce a change in the intensity of the transmitted light. For example, during alignment of the atoms in the $M=+2$ sublevel accomplished in the system of FIG. 1 the initially transmitted light intensity $I_1$ detected by the photocell 17 will increase to a value $I_1 + \Delta I$. By adiabatically reversing the direction of the magnet field $H_0$ together with the axis of the quantization which leaves the population distribution unchanged or by only reversing the circular polarization of the light from clockwise to counterclockwise, the selection rule $\Delta M = -1$ governs rather than $\Delta M = +1$ and the initially nonabsorbing sublevel $M=+2$ immediately becomes absorbing while the $M=-2$ sublevel switches from the absorbing to nonabsorbing. Since the now absorbing sublevel $M=+2$ has been overpopulated, the atoms therein absorb the light and thus result in a substantial decrease in the light impinging on the photocell. The intensity of the light immediately decreases from $I_1 + \Delta I$ to $I_1 - \Delta I$. However, due to the optically pumping out of the absorbing sublevel $M=+2$ and the increasing overpopulation of the nonabsorbing $M=-2$ sublevel, the light intensity detected by the photocell 17 will return to the value $I_1 + \Delta I$ as can be seen by the plot of light intensity versus time in FIG. 4, the curve starting at the instant the polarized light is first applied to the absorption vessel. The manner of determining experimental decay times $\tau$ is shown in FIG. 4. The usefulness of this system as a fast operating light shutter is immediately obvious to those skilled in the art.

Figure 5:
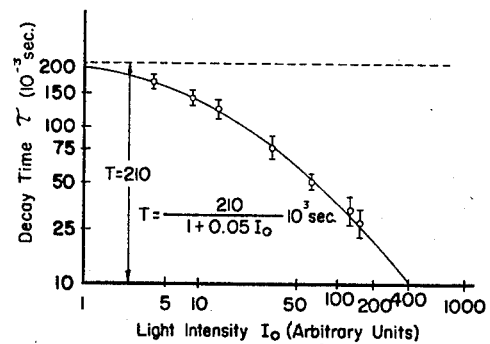
FIG. 5 is a plot of the experimental decay time $\tau$ of the spin alignment versus light intensity $I_0$.

Referring to FIG. 5 there is shown a plot of the experimental decay time $\tau$ of the spin polarization versus intensity $I_0$ of the light transmitted into the absorption vessel 11. This plot permits the determination of the spin relaxation time T as distinguished from $\tau$.

The above example of sodium atoms was utilized to describe this invention. It will be immediately recognized by those skilled in this art that this invention is not limited to sodium atoms but applies, for example, to the other alkali atoms such as potassium, rubidium and cesium.

Two disadvantages in the use of sodium are the relatively high temperatures needed both at the light source and in the absorption cell (230° C. and 140° C., respectively) and the close spacing of 6 Angstrom units of the sodium D lines, making the filtering out of one of the lines difficult. In the case of the alkali metals potassium, rubidium and cesium the radiation lines which excite the $P_{1/2}$ and $P_{3/2}$ energy levels are relatively far apart and may be separated by interference filters. Potassium is quite satisfactory for many types of applications of this invention. The operating characteristics of the potassium absorption cell appears to be optimum at about 60° C., an ideal ambient temperature. The two spectral lines of interest for potassium are at 7,665 and 7,699 Angstrom units making the filtering problem somewhat simpler than in the case of sodium. Rubidium has the advantage that it has a very high hyperfine constant, resulting in very small Back-Goudsmit splitting in the earth's magnetic field, and that the two spectral lines of interest are over one hundred Angstrom units apart (7800–7948 A.) making filtering extremely simple. The operating temperature for the rubidium absorption cell is near room temperature. Cesium (8521–8943 A.) requires still lower operating temperatures and may require refrigeration. Cesium has a higher vapor pressure of operation and therefore allows the use of a smaller sample. Lithium has a very low vapor pressure, requiring high operating temperatures, and also the two spectral lines are very close together (less than 1 Angstrom unit).

As stated above, the pressure of the buffer gas utilized in a preferred embodiment of this invention is much higher than deemed usable in the past. Previous techniques involving the optical pumping of alkali atoms utilized buffer gas pressures of about 1 mm. Hg or less and resulted in alignment in the optically excited states. The thermal relaxation process in optically excited states is much shorter than that in ground states and, unlike the ground state, the relaxation is caused in large degree by collisions between the alkali atoms and the buffer gas. So it comes about that at the high buffer pressure (30 mm. Hg) which in one preferred embodiment of this invention is essential to obtain the long ground state relaxation times the population distribution over the sublevels of the excited $^2P$ level is essentially randomized before emission occurs. Under these conditions the polarization of the resonance fluorescence approaches zero and the prior alignment monitoring schemes relying on it fail; not so however the transmission monitoring scheme of this invention. In the latter one the alignment of the $^2S$ ground state alone counts while the disordering of the $^2P$ state is irrelevant.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for aligning alkali atoms in the ground state comprising:

an absorption vessel for containing such alkali atoms in a unidirectional field;

means for irradiating the alkali atoms with optical resonance radiation that has a propagation direction component parallel to the unidirectional magnetic field, such radiation having a spectral frequency supplying quanta of energy to produce transitions between energy levels so that the alkali atoms may be aligned in their ground state; and means for minimizing the collisions of atoms with the walls of the containing absorption vessel said minimizing means comprising a buffer gas at a pressure substantially greater than one millimeter of mercury so that the relaxation time of the atoms is increased, thereby maintaining the alignment of the alkali atoms in the ground state for an increased period, and means for measuring the intensity of non-absorbed optical radiation received from said absorption vessel during the alignment of the alkali atoms in the ground state.

2. Apparatus for aligning and monitoring the ground state sublevels of one optical electron quantums comprising:

a sample of such quantum systems contained within an absorption vessel;

means for increasing the relaxation time of the quantum systems in the ground state, comprising a buffer gas at a predetermined pressure mixed with said sample within the vessel for minimizing the collisions of atoms with the walls of the containing absorption vessel;

means for applying a beam of circularly polarized light to said sample;

means for applying a unidirectional magnetic field to said sample simultaneously with the polarized light beam; and means for detecting the intensity of the light energy that has passed through the absorption vessel without absorption so that the absorption by ground state sublevels of the aligned atoms of the sample may be monitored.

3. Apparatus as in claim 2, wherein the buffer gas has a pressure substantially greater than one millimeter of mercury, and serves to reduce the collisions of the alkali atoms with the walls of the absorption vessel.

4. Apparatus as in claim 2, including means for reversing the circular sense of the polarized light.

5. Apparatus for aligning alkali atoms in vapor form in their ground state in a unidirectional magneitc field which comprises:

an absorption vessel in which the alkali atoms are mixed with a buffer gas;

means for irradiating the alkali atoms with circularly polarized optical resonance radiation having a substantial propagation direction component parallel to the unidirectional magnetic field, said optical radiation having a spectral frequency supply quanta of energy to produce transitions between energy levels whereby the atoms may be aligned in the ground state;

said buffer gas having a predetermined pressure so that the magnetic relaxation time of the alkali atoms in the optically excited state is shorter than the time that it takes the atoms to emit radiation and return to the ground state;

filter means for suppressing the $S_{1/2} \leftrightarrow P_{3/2}$ line from said resonance radiation thereby further enhancing said alignment.

6. The apparatus as claimed in claim 5, further including means for intercepting the non-absorbed optical radiation after it has passed through said atoms for detecting the intensity thereof as a function of the alignment of said atoms.

7. Apparatus for aligning and monitoring said alignment of alkali atoms which comprises:

an absorption vessel containing said alkali atoms in vapor form positioned in a unidirectional magnetic field, said vapor being mixed with buffer gas having a predetermined pressure so that the magnetic relaxation time of the alkali atoms in optically excited states is shorter than the time it takes such atoms to emit radiation and return to the ground states;

means for producing a beam of circularly polarized optical radiation directed through said absorption bessel in a propagation direction having a substantial component parallel to said unidirectional magnetic field, said optical radiation having a spectral frequency supplying quanta of energy to produce transitions between energy levels whereby said atoms are aligned in said unidirectional magnetic field;

optical radiation detecting means intercepting said beam after it has passed through said vessel for measuring the intensity of said radiation as a function of the alignment of said atoms due to the absorption of energy said optical radiation during said alignment transitions.

8. Apparatus as claimed in claim 7 wherein the buffer gas is under a pressure greater than 1 mm. of mercury.

9. Apparatus for aligning the ground state sublevels of one optical electron quantum systems comprising:

a sample of said quantum systems in gas or vapor form mixed with a buffer gas having a predetermined pressure so that the lifetimes of the aligned systems in the ground state are substantially increased;

said systems being positioned in a unidirectional magnetic field;

an optical radiation source for irradiating said sample with optical radiation having a spectrum supplying quanta of energy to produce transitions from the ground state to at least one optically excited state of said quantum systems;

means interposed between said source and said sample for filtering all but one of a plurality of spectral lines of said optical radiation so the optical radiation reaching said quantum systems is differentially absorbed by said ground state sublevels, whereby the less strongly absorbing sublevels are populated at the expense of the more strongly absorbing sublevels; and means for detecting the non-absorbed optical radiation after it has passed through said quantum systems.

10. The apparatus of claim 9 wherein said means interposed between said source and said sample includes means for circularly polarizing said radiation.

11. The apparatus of claim 9 wherein said quantum systems are alkali atoms.

12. The apparatus of claim 9 wherein said buffer gas is under a pressure substantially greater than 1 mm. of mercury.

References Cited by the Examiner
UNITED STATES PATENTS
2,884,524    4/1959    Dicke _____ 324—0.5

OTHER REFERENCES

Hawkins: Physical Review, vol. 98, No. 2, April 15, 1955, pages 478 to 486 incl.

Althoff-Zeitschrift Fur Physik-Bd 141, 1955, pages 33 to 42.

Ritter et al.: Royal Society of London, Proceedings, vol. 238, No. 1215, Jan. 29, 1957, pages 473 to 488 incl.

Seiwert-Annalen Der Physik, vol. 18, No. 1–2, May 1956, pages 54 to 79 incl.

Phelps-Physical Review, vol. 99, No. 4, Aug. 15, 1955, pages 1307 to 1313 incl.

MAYNARD R. WILBUR, *Examiner.*

CHESTER L. JUSTUS, *Primary Examiner.*

UNITED STATES PATENT OFFICE
CERTIFICATE OF CORRECTION

Patent No. 3,267,360                                August 16, 1966

Hans G. Dehmelt

It is hereby certified that error appears in the above numbered patent requiring correction and that the said Letters Patent should read as corrected below.

Column 3, line 12, for "Thet" read -- The --; column 4, line 29, for "potical" read -- optical --; line 54, for "$S^2P_{1/2}$" read -- $3^2P_{1/2}$ --; column 5, line 37, after "return" insert -- scheme from the $^2P$ level. --; column 7, line 55, for "supply" read -- supplying --; column 8, line 9, for "bessel" read -- vessel --; line 19, after "epergy" insert -- from --.

Signed and sealed this 26th day of September 1967.

(SEAL)
Attest:

ERNEST W. SWIDER                           EDWARD J. BRENNER
Attesting Officer                                Commissioner of Patents